Nov. 8, 1949  G. V. MORRIS  2,487,258
SHADED POLE MOTOR
Filed Nov. 29, 1946

GEORGE V. MORRIS
INVENTOR.

BY David M. Davis
HIS ATTORNEY

Patented Nov. 8, 1949

2,487,258

UNITED STATES PATENT OFFICE 2,487,258

SHADED POLE MOTOR

George V. Morris, Berkeley, Ill., assignor to Zenith Radio Corporation, a corporation of Illinois Application November 29, 1946, Serial No. 712,991

2 Claims. (Cl. 172—278)

This invention relates to shaded pole induction motors.

Shaded pole induction motors are widely used in applications requiring a compact, inexpensive drive motor. They are known to be relatively inefficient but their advantages of low expense and compact size frequently overshadow their inefficiency.

To the end of reducing construction expense, numerous improvements have been suggested and are known to the art. As one example, the squirrel cage bars, the end caps, and the fan blades on the rotor of an induction machine have been die cast integrally.

However, the shading coils on the stator have been separate short circuited turns of bus bar or heavy wire mounted in grooves or openings in the stator construction, with the abutting ends of each coil brazed together. This is normally a manual operation and is, therefore, slow and expensive.

It is desirable to keep the resistance of the shading coil very low. With the uniform conductors commonly used to make the coils, the practically usable size of the conductor is limited by the allowable size of opening in the core constituting the magnetic flux path.

It is a principal object of this invention to provide an improved shaded pole induction motor which is relatively simple and inexpensive to construct, because of the omission of a conventional part of the motor, the function of which is performed by the shading coil structure.

The features of the present invention which are believed to be novel are set forth with particularity in the appended claims. The present invention itself, both as to its organization and manner of operation, together with further objects and advantages thereof may best be understood by reference to the following description taken in connection with accompanying drawings in which:

Figures 1, 2, 3:
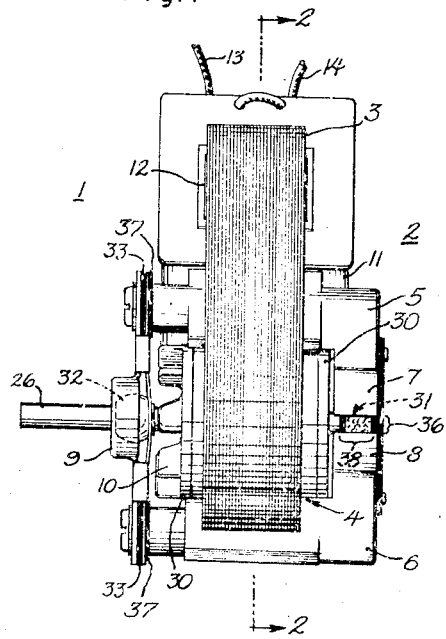
Figure 1 is a perspective view of an embodiment of this invention.
Figure 2 is a cross-sectional view taken along line 2—2 in Figure 1 with certain parts removed.
Figure 3 is a plan view of a part of the device of Figure 1.

In Figure 1, motor 1 includes stator 2 having core stack 3, opening 4 therein, shading coil structures 5 and 6, bearing brackets 7 and 8 integral with shading coil structures 5 and 6, respectively, bearing support 9, rotor 10 rotatable in opening 4 and supported in spaced relation to the walls of opening 4 by bearing brackets 7 and 8 and bearing support 9, and exciting coil 11 mounted on core leg 12.

In Figure 2, shading coil structure 5 includes first conductor 20, second conductor 21, and a common short circuiting bar 22 integral with conductors 20 and 21. Similarly, shading coil structure 6 includes conductors 23 and 24 and short circuiting bar 25. Preferably, the conductors 20, 21, 23 and 24, and short circuiting bars 22 and 25 are electrically insulated from core stack 3. This is accomplished by coating the entire core stack with a heat resistant lacquer before casting the conductors and short circuiting bars into the core.

Rotor 10 includes shaft 26, rotor core 27 mounted thereon, and squirrel cage conductors 28 passing through openings 29 in rotor core 27. Conductors 28 terminate at opposite ends in end rings 30, shown in Figure 1, which form conductive bonds between common ends of conductors 28.

In Figure 3, lamination 40 has rotor opening 4 therein. Conductor openings 41, 42, 43, and 44 are provided for conductors 20, 21, 23 and 24, respectively, of Figure 2. Upper notch 45 and lower notch 46 are provided to assure high reluctance to magnetic flux flow in the region of those notches. Openings 34 are provided for passage of means for securing several laminations together to form core stack 3. Cutouts 47 are provided to pass core leg 12.

Considering Figures 1, 2, and 3 in detail, alternating voltages impressed on exciting coil 11 through wires 13 and 14 produce an alternating magnetic flux in core leg 12 which, considered instantaneously, flows through portion 15 of core stack 3 into pole portion 16, across air gap 17, through rotor 10, to second pole portion 18 back to core leg 12 through portion 19, and the magnetic circuit is completed. Magnetic flux is forced through air gap 17 and rotor 10 because in the region of notches 45 and 46 saturation of core stack 3 occurs and a very high magnetic reluctance appears which impedes flux flow through these iron paths.

When alternating flux flows through pole portions 16 and 18, it links shading coil structures 5 and 6. The alternating voltage induced in the shading coil including first conductor 20 and short circuiting bar 22 causes current to flow in these elements. Because of the resistance inherent in the shading coil, this current is at something less than time phase quadrature with the voltage induced in the coil and the magnetic flux produced by the flow of this current is out of phase with the exciting flux.

This out-of-phase flux from the shading coil including conductor 20, links a second shading coil, including conductor 21 and the common short circuiting bar 22. A voltage is induced in this second shading coil, current not in time phase quadrature with the induced voltage flows through conductor 21 and bar 22, and a flux further out of phase with the exciting flux from coil 11 is produced. Exciting flux may be partially prevented from linking the second shading coil directly by slotting the core stack 3 from rotor opening 4 to conductor opening 44, thus placing a high reluctance air gap in the flux path. The self-inductance of the shading coils is thus reduced, the requisite internal resistance of the coils is reduced, and the efficiency of the motor is increased. It may be desirable for optimum flux phase shift characteristics to mold conductor 20 with greater cross-sectional area than conductor 21.

Similarly, magnetic flux flowing from pole portion 18 towards portion 19 induces an alternating voltage in the shading coil including conductor 23 and the common short circuiting bar 25 of shading coil structure 6. A current flows in this coil with a phase lag which is less than 90° with respect to the induced voltage. The magnetic flux produced by this current flow is out of phase with the main exciting flux. As described in connection with shading pole structure 5, the shading coil including conductor 24 and short circuiting bar 25 has induced in it a voltage which arises from the existence of this out-of-phase magnetic flux from the shading coil including conductor 23. A magnetic flux is thus produced which is further out of phase with the main flux from exciting coil 11. Conductor 23 may be of greater cross-sectional area than conductor 24 for optimum phase shift characteristics.

While shading pole structures 5 and 6 have been described as each including only two shading coils it should be understood that one or more shading coils may be used in each structure, the upper limit to the number of coils being limited by practical mechanical considerations.

It is well known that for optimum starting torque in an induction motor there must be created a rotating magnetic field. This is a simple requirement in the case of multi-phase induction motors but with single phase induction motors, such as the present device constitutes, the requirement is not so easily met. Basically, to produce such a rotating field, it is necessary to have at least two sets of field coils mounted in 90° space phase relationship to each other and excited 90° apart in time phase. While in the simple motor just described this ideal relationship is not realized, the shading coils are effective to produce a magnetic flux which differs in time and space phase from the main exciting flux.

By adjusting the resistance of the shading coils the amount of phase shift in the flux produced by those coils can be varied. By using a pair of shading coils, as described herein, the resistance of each of the shading coils can be kept at a minimum while obtaining the required phase shift. By keeping the resistance of the shading coils low, the power dissipated in those coils is also kept low and the efficiency of the motor is increased.

In the present invention, conductors 20, 21, 23 and 24 and short circuiting bars 22 and 25 are die cast. The metal normally used in this die cast operation is an aluminum alloy and by varying the content of silicon in the aluminum the resistance of the conductors and, hence, of the shading coils, can be varied to suit the requirements. Because of the large cross-sectional area of the common short circuiting bars 22 and 25, the resistance of the shading coils in structures 5 and 6 can be made much lower than would be possible if each shading coil was made from a single conductor having the cross-sectional area of the die cast conductor portions 20, 21, 23 and 24. Simultaneously, of course, the mechanical strength and rigidity of the bearing brackets is increased.

The mechanism by which the nominally rotating field causes rotor 10 to revolve is well known. Voltages are induced in the rotor coils made up of squirrel cage conductors 28, the common ends of which are joined by short circuiting end rings 30. These voltages result ultimately in fluxes which react with the rotating field and cause the rotor to revolve at a speed slightly less than that speed which is synchronous with the revolving field.

Rotor 10 is supported in rotatable relationship to stator 2 by means of sleeve bearings 31 and 32 supported in bearing brackets 7 and 8, and bearing support 9, respectively.

It is to be noted that bearing brackets 7 and 8 are die cast integrally with shading pole structures 5 and 6, respectively. Thus, the centering of the bearing is made simple and accurate.

It is also to be noted that bearing support 9 is insulated by means of washers 33 and 37 and that bearing 31 is insulated from bearing brackets 7 and 8. These precautions are necessary to prevent the existence of a continuous electrical loop surrounding the main magnetic path through the rotor 10. Such a loop would consume a large amount of power needlessly and, thus, by making the loop electrically discontinuous, as is done in the present invention, reasonable efficiency is preserved for the motor.

The method of die casting the combined shading pole structures 5 and 6 and bearing brackets 7 and 8 is relatively simple. The appropriate number of laminations, like lamination 40 in Figure 3, are stacked together and secured by means of rivets or bolts 35. In one manufacturing method, this structure is placed in the appropriate mold in the so-called "cold shot" machine and the molten aluminum-silicon alloy is forced into the mold under high pressure. Conductors 20, 21 and short circuiting bar 22 are formed integrally with bearing bracket 7. For reasons of mechanical strength in the die cast process, bearing bracket 7 is made integrally with bearing bracket 8, which, in turn, is integral with conductors 23 and 24, and short circuiting bar 25. When the die casting process is completed, the core stack structure is removed from the die and slot 36 is milled, thus separating bearing brackets 7 and 8, and providing an electrical discontinuity at those points. Sleeve bearing 31 in its electrically insulating support 38 is mounted between bearing brackets 7 and 8. Bearing support 9 carrying sleeve bearing 32 is mounted on extensions of shading pole structures 5 and 6 on the opposite side of stator 2 from bearing brackets 7 and 8. Thus, both bearing brackets for accurately centering the rotor bearings and shading coil structures are provided by the simple die cast structure in the present induction motor.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An induction motor including a stator portion and a cylindrical rotor portion supported in rotatable relation to said stator portion, said stator including a core stack having an opening therethrough for rotation of said rotor portion therein, a main flux exciting coil mounted on said core stack, a pair of pole portions integral with said core stack on diametrically opposite sides of said rotor and contiguous with said opening, shading coil structures supported on opposite sides of said opening along a different diameter from that on which said pole portions lie and encircling a portion of said core stack, said shading coil structures each including at least one conductor and a shorting bar common to each structure, a pair of bearing brackets mutually insulated from one another, a bearing supported by said bearing brackets and supporting said rotor portion, each of said bearing brackets being integral with one of said shading coil structures.

2. A single phase induction motor including a stationary portion and a cylindrical portion rotatable therein, said stationary portion including a ferromagnetic core having an opening therein for said rotatable portion, a main flux exciting coil thereon, a pair of magnetic pole portions contiguous with said opening on opposite sides thereof and excited by flux from said exciting coil, a pair of shading coil structures on diametrically opposite sides of said opening and displaced from said main pole portions along the periphery of said opening, each encircling a portion of said core, first and second bearings rotatably supporting said rotating portion, a pair of brackets mutually insulated from one another and fixedly supporting said first bearing in accurate relation to said opening, each of said brackets being integral with one of said shading coil structures.

G. V. MORRIS.

REFERENCES CITED

The following references are of record in the file of this patent:

UNITED STATES PATENTS

| Number | Name | Date |
|---|---|---|
| 1,534,282 | Packard | Apr. 21, 1925 |
| 1,576,002 | Packard | Mar. 9, 1926 |
| 1,992,956 | Lilja | Mar. 5, 1935 |
| 2,049,261 | Haydon | July 28, 1936 |
| 2,108,569 | Togami | Feb. 15, 1938 |

FOREIGN PATENTS

| Number | Country | Date |
|---|---|---|
| 582,890 | France | Oct. 22, 1924 |